(12) United States Patent
Velammal et al.

(10) Patent No.: US 11,770,455 B2
(45) Date of Patent: Sep. 26, 2023

(54) SYSTEM AND METHOD FOR APPLICATION MIGRATION BETWEEN CLOUD PLATFORMS

(71) Applicant: Cognizant Technology Solutions India Pvt. Ltd., Chennai (IN)

(72) Inventors: Parasu Pillai Iyappan Velammal, Chennai (IN); Karthikeyan Mohan, Chennai (IN); Rangarajan Ramadass, Chennai (IN); Selvaraj Natarajan, Chennai (IN)

(73) Assignee: COGNIZANT TECHNOLOGY SOLUTIONS INDIA PVT. LTD., Chennai (CN)

( * ) Notice: Subject to any disclaimer, the term of this patent is extended or adjusted under 35 U.S.C. 154(b) by 31 days.

(21) Appl. No.: 17/674,014

(22) Filed: Feb. 17, 2022

(65) Prior Publication Data
US 2023/0188613 A1    Jun. 15, 2023

(30) Foreign Application Priority Data
Dec. 14, 2021    (IN) .............................. 202141058252

(51) Int. Cl.
| | |
|---|---|
| *G06N 5/04* | (2023.01) |
| *H04L 67/00* | (2022.01) |
| *G06F 8/60* | (2018.01) |
| *G06F 8/72* | (2018.01) |
| *H04L 67/01* | (2022.01) |

(52) U.S. Cl.
CPC ............... *H04L 67/34* (2013.01); *G06F 8/60* (2013.01); *G06F 8/72* (2013.01); *H04L 67/01* (2022.05)

(58) Field of Classification Search
CPC . H04L 67/34; H04L 67/01; G06F 8/60; G06F 8/72
See application file for complete search history.

(56) References Cited

U.S. PATENT DOCUMENTS

| | | |
|---|---|---|
| 8,997,088 B2 | 3/2015 | Gurikar |
| 9,444,896 B2 | 9/2016 | Zheng |
| 9,891,946 B2 | 2/2018 | Bavishi |

(Continued)

*Primary Examiner* — Nicholas P Celani
*Assistant Examiner* — Wuji Chen
(74) *Attorney, Agent, or Firm* — CANTOR COLBURN LLP

(57) ABSTRACT

The present invention provides for migration of application running on source cloud platform to target cloud platform. In operation, the present invention provides for retrieving analysis-data including source code of application to be migrated, hereinafter referred to as application M, a runtime data of application M, and target cloud platform data. The present invention further provides for identifying migration parameters based on analysis-data. Further, migration readiness of application M to target cloud platform is assessed based on migration parameters. Furthermore, a migration readiness report is generated based on the migration parameters, migration readiness assessment and the runtime data. Yet further, deployment configurations for the application M are generated as per the target cloud platform based on the migration readiness report. Yet further, the application is migrated to the target cloud platform based on the generated deployment configurations by creating Continuous Integration/Continuous Deployment (CI/CD) pipeline.

30 Claims, 4 Drawing Sheets

(56) References Cited

U.S. PATENT DOCUMENTS

| | | |
|---|---|---|
| 10,419,546 B2 | 9/2019 | Sharma |
| 11,150,880 B1* | 10/2021 | Parisa ................... G06F 40/30 |
| 11,385,892 B1* | 7/2022 | Zhang ................ G06F 16/9535 |
| 11,467,828 B1* | 10/2022 | Zhang .................... H04L 67/34 |
| 2013/0054521 A1* | 2/2013 | Cai ....................... G06F 16/10 707/613 |
| 2014/0351372 A1* | 11/2014 | Xu ..................... H04L 67/148 709/217 |
| 2015/0058486 A1* | 2/2015 | Huang ................. H04L 47/70 709/226 |
| 2015/0261842 A1* | 9/2015 | Huang ................ G06F 16/284 707/758 |
| 2020/0137163 A1* | 4/2020 | Baghsorkhi ............ H04L 47/82 |
| 2021/0065090 A1* | 3/2021 | Chatterjee ................. G06N 5/01 |
| 2021/0124822 A1* | 4/2021 | Tiwary ................... G06F 21/53 |
| 2021/0149769 A1* | 5/2021 | Balcha ............... G06F 11/1469 |
| 2021/0182703 A1* | 6/2021 | Velammal ............. G06N 5/046 |
| 2021/0271463 A1* | 9/2021 | Pal ........................... G06F 8/76 |
| 2021/0279066 A1* | 9/2021 | Xiao .................... G06F 9/3891 |
| 2022/0237154 A1* | 7/2022 | Pal ........................ G06N 5/027 |
| 2022/0300357 A1* | 9/2022 | Pal .......................... G06N 5/02 |
| 2023/0038345 A1* | 2/2023 | Pal ....................... G06F 9/5038 |

\* cited by examiner

SYSTEM AND METHOD FOR APPLICATION MIGRATION BETWEEN CLOUD PLATFORMS

CROSS REFERENCE TO RELATED APPLICATION

This application is related to and claims the benefit of Indian Patent Application Number 202141058252 filed on Dec. 14, 2021, the contents of which are herein incorporated by reference in their entirety.

FIELD OF THE INVENTION

The present invention relates generally to the field of cloud computing. More particularly, the present invention relates to a system and a method for migrating applications from source cloud platform to a target cloud platform.

BACKGROUND OF THE INVENTION

With advancement in technology various application development and deployment organizations have opted for cloud computing, where computing services, including, but not limited to, servers, storage, databases, networking devices, software, analytics, and intelligence are delivered over the network (particularly internet) to said organizations. Cloud computing offers faster innovation, flexible resources, and scaling capability. However, due to various reasons such as, but not limited to, improvement in cloud computing offerings by various vendors, cost and/or rapid application development and scaling, the application running on existing cloud platform also referred to as source platform have to be migrated to another cloud platform referred to as target platform.

At present, in order to migrate an application from source cloud platform to target cloud platform, trial and error is used by migration teams to determine the best approach for application cloud assessment and migration readiness from source cloud platform to target cloud platform. In particular, the application code running on the source cloud platform is manually analyzed using trial and error to identify runtime state of the application, such as the number of instances of the application and computing resource utilization, equivalent alternatives for backing services of the source cloud platform and cloud impediments associated with the application migration. Further, the cloud anti-patterns violating 15 factors principles, including one codebase, one application; API first; dependency management; design, build, release, and run; configuration, credentials, and code; logs; disposability; backing services; environment parity; administrative processes; port binding; stateless processes; concurrency; telemetry; and authentication and authorization are determined manually by analyzing the application code using trial and error approach. Furthermore, the deployment configurations are manually remediated and created as per the target cloud platform before migration. The afore-described process of moving application running on source cloud platform to target cloud platform is tedious, requires large amount of time, manual effort and cost. Moreover, as the process involves the use of trial and error, the process is prone to errors and the manual steps may extend up to months depending upon the complexity of the code and cloud platforms.

In order to overcome the manual process of cloud migration assessment, various tools have been explored that generate cloud migration readiness report automatically by analyzing application source code and identifying cloud anti-patterns based on a set of predefined static rules. However, the existing tools do not perform runtime analysis of the application running on the source cloud, which is to be migrated. In particular, the existing tools do not utilize runtime information associated with the application to be migrated, such as the number of instances of the application running on the source cloud and computing resource utilization. The runtime information associated with the application to be migrated is essential for determining resource allocation and accordingly generating deployment configurations. Further, the existing tools do not perform analysis of information associated with backing services consumed at the runtime of application to be migrated which is essential for determining alternative backing services in target cloud platform. The lack of runtime analysis lead to generation of inaccurate deployment configurations that adversely affect resource allocation during migration of application to a target cloud platform. Furthermore, the exiting tools maintain migration assessment data in their own repository which may cause security concerns to the organizations using the tool.

In light of the above drawbacks, there is a need for a system and a method that can automatically migrate application between various cloud platforms. In particular, there is a need for a system and a method that can perform accurate cloud migration assessment considering various parameters including cloud impediments, anti-pattern violations, data associated with resources and backing services consumed at the runtime of the application to be migrated. There is a need for a system and a method that can automatically generate deployment configurations as per the target cloud platform. Further, there is a need for a system and a method that minimizes manual intervention. Furthermore, there is a need for a system and a method that can automatically recommend alternate backing services in target cloud platform for efficient application migration. Yet further, there is a need for a system which is inexpensive, secure and can be readily integrated with customer's onsite systems.

SUMMARY OF THE INVENTION

In various embodiments of the present invention, a method for migrating an application from a source cloud platform to a target cloud platform is provided. The method is implemented by at least one processor executing program instructions stored in a memory. The method comprising evaluating migration parameters based on a source code of the application, a runtime data associated with the application and a target cloud platform data. The migration parameters include cloud impediments associated with the application, a tech-stack suitability score, anti-patterns associated with the application, a migration complexity score associated with the application, and equivalent backing services associated with the target cloud platform. The method further comprises assessing a migration readiness of the application to the target cloud platform based on one or more evaluated migration parameters. Further, the method comprises generating a migration readiness report based on the evaluated migration parameters, the assessed migration readiness and the runtime data of the application. Furthermore, the method comprises generating deployment configurations as per the target cloud platform for migrating the application based on the migration readiness report. Yet further, the method comprises migrating the application from the source cloud platform to the target cloud platform based on the generated deployment configurations.

In accordance with various embodiments of the present invention, a system for migrating an application from a source cloud platform to a target cloud platform is provided. The system comprises a memory storing program instructions, a processor configured to execute program instructions stored in the memory, and an assessment and migration engine executed by the processor and configured to evaluate migration parameters based on a source code of the application, a runtime data associated with the application and a target cloud platform data. The migration parameters include cloud impediments associated with the application, a tech-stack suitability score, anti-patterns associated with the application, a migration complexity score associated with the application, and equivalent backing services associated with the target cloud platform. Further, the system is configured to assess a migration readiness of the application to the target cloud platform based on one or more evaluated migration parameters. Furthermore, the system is configured to generate a migration readiness report based on the evaluated migration parameters, the assessed migration readiness and the runtime data of the application. Yet further, the system is configured to generate deployment configurations as per the target cloud platform for migrating the application based on the migration readiness report. Yet further, the system is configured to migrate the application from the source cloud platform to the target cloud platform based on the generated deployment configurations.

In accordance with various embodiments of the present invention, a computer program product is provided. The computer program product comprises a non-transitory computer-readable medium having computer-readable program code stored thereon, the computer-readable program code comprising instructions that, when executed by a processor, cause the processor to evaluate migration parameters based on a source code of the application, a runtime data associated with the application and a target cloud platform data. The migration parameters include cloud impediments associated with the application, a tech-stack suitability score, anti-patterns associated with the application, a migration complexity score associated with the application, and equivalent backing services associated with the target cloud platform. Further, a migration readiness of the application to the target cloud platform is assessed based on one or more evaluated migration parameters. Furthermore, a migration readiness report is generated based on the evaluated migration parameters, the assessed migration readiness and the runtime data of the application. Yet further deployment configurations are generated as per the target cloud platform for migrating the application based on the migration readiness report. Finally, the application is migrated from the source cloud platform to the target cloud platform based on the generated deployment configurations.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
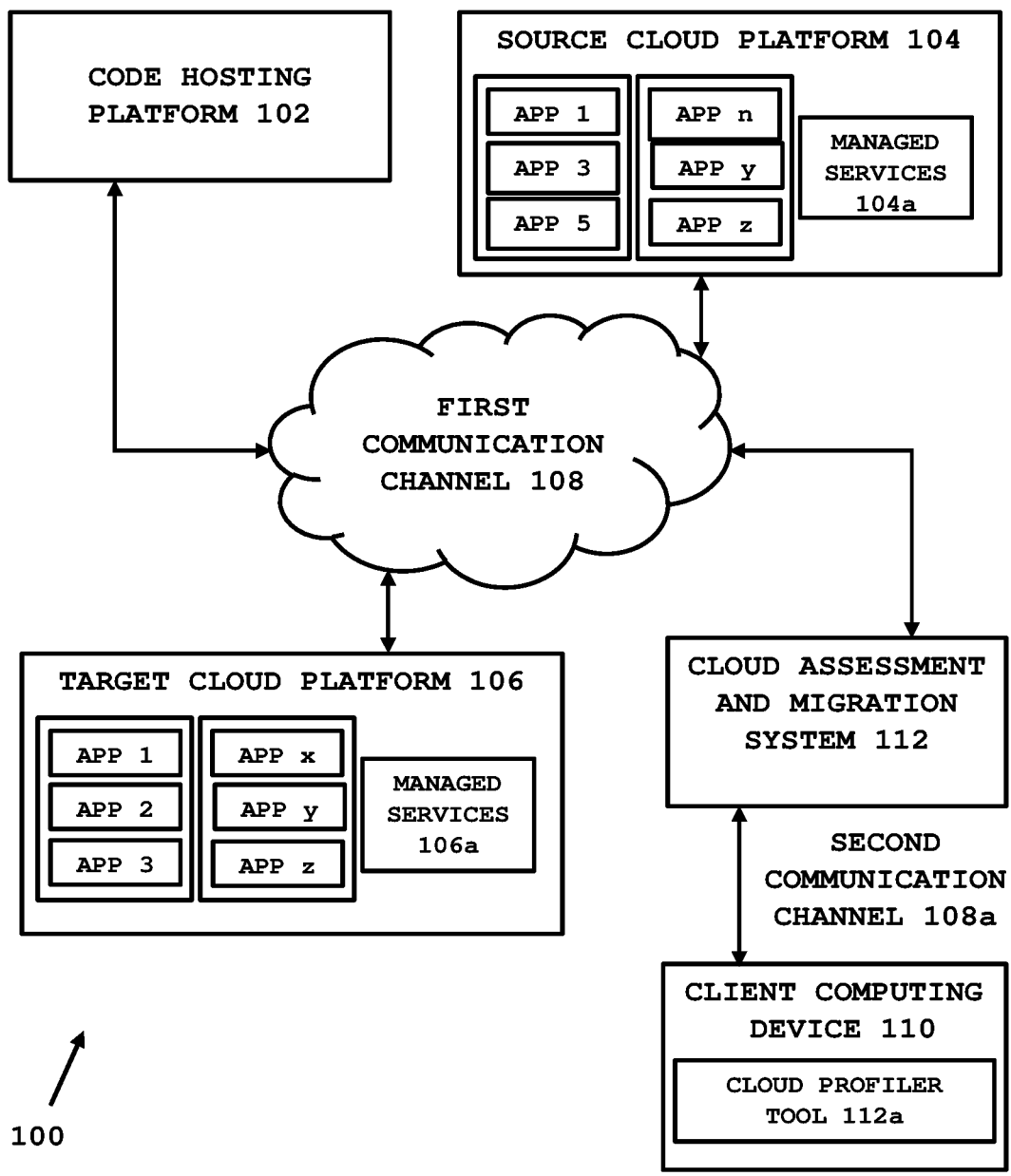
FIG. 1 is a block diagram of a computing environment including a system for application migration between cloud platforms, in accordance with various embodiments of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The terms "source cloud platform" and "selected source cloud platform" have been used interchangeably. The terms "target cloud platform" and "selected target cloud platform" have been used interchangeably.

The present invention discloses a system and a method for application migration between cloud platforms. In particular, the present invention discloses a system and a method that assesses readiness of an application running on a source cloud platform for migration to a target cloud platform and provides alternatives and recommendations to improve the readiness, and further generates deployment configurations for application migration to the target cloud platform. In operation, the present invention provides for retrieving analysis-data including source code of the application to be migrated, source cloud platform data comprising at least a runtime data associated with the application M, and the target cloud platform data. The present invention further provides for identifying migration parameters, including but not limited to, cloud impediments, tech-stack suitability score, anti-patterns, migration complexity score, and equivalent backing services associated with the target cloud platforms based on the analysis-data. Further, a migration readiness of application M to the target cloud platform is assessed based on the migration parameters including tech-stack suitability score, anti-patterns and migration complexity score. Furthermore, a migration readiness report is generated based on the migration parameters, migration readiness assessment and the source cloud platform data. Yet further, the present invention, provides for generating deployment configurations for the application M as per the target cloud platform based on the migration readiness report. Finally, the present invention provides for migrating the application to the target cloud platform based on the generated deployment configurations by creating Continuous Integration/Continuous Deployment (CI/CD) pipeline.

The present invention would now be discussed in context of embodiments as illustrated in the accompanying drawings.

Referring to FIG. 1 a block diagram of a computing environment including a system for application migration between cloud platforms is illustrated. In an embodiment of the present invention the computing environment 100 includes a code hosting platform 102, a source cloud platform 104, a target cloud platform 106, a client computing device 110 and a system for application migration between cloud platforms, herein after referred to as cloud assessment and migration system 112.

In accordance with various embodiments of the present invention, the code hosting platform 102 is any platform which provides resources for at least one of: building, hosting, storing, and managing source codes of one or more applications. In accordance with various embodiments of the present invention, the code hosting platform 102 may be a general purpose computer such as a desktop, a laptop, and a server computer; a super computer; a microcomputer; a virtual computer or any other device capable of executing instructions, connecting to a network, providing resources for building, sharing, storing, and hosting software applications, and sending/receiving data. In an embodiment of the present invention, the code hosting platform 102 is a Github platform. In an embodiment of the present invention, the code hosting platform 102 interfaces with the cloud assessment and migration system 112 via a first communication channel 108. Examples of the first communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In accordance with various embodiments of the present invention, the source cloud platform 104 and the target cloud platform 106 are any cloud platforms that provide computing services, including, but not limited to, servers, storage, databases, networking devices, software resources, analytics, and intelligence over a network, particularly internet to the consumers. In an embodiment of the present invention, the source cloud platform 104 and the target cloud platforms 106 provides computing services via platform as a service (PaaS) architecture to build, test, deploy, manage, and update software applications. Examples of source cloud platform 104 and the target cloud platform 106 may include, but are not limited to, Microsoft Azure, Amazon Web Services (AWS), Cisco Metacloud, Google Compute Engine (GCE), etc.

In an embodiment of the present invention, the source cloud platform 104 is configured to host a plurality of applications (app1, app3, app5, app(n) etc.) and managed backing services 104*a*, such as, but not limited to databases, file storage, and messaging brokers for at least one of: building, testing, deploying, managing, and updating software applications. In an exemplary embodiment of the present invention, one or more of the plurality of applications (app1, app3, app5, app(n) etc.) may be assessed and migrated to the target cloud platform 106. In accordance with various embodiments of the present invention, the software application to be assessed and migrated, hereinafter referred to as application M is deployed and hosted via the source cloud platform 104. In an embodiment of the present invention, the source cloud platform 104 interfaces with the cloud assessment and migration system 112 over the first communication channel 108 to provide runtime data associated with the application M. In an embodiment of the present invention, the runtime data includes, but is not limited to, CPU consumption of application M in the source cloud platform, memory consumed/requested by the application M in the source cloud platform, build packs used for hosting the application M in the source cloud platform, number of instances of the application M running on the source cloud platform, and data associated with backing services consumed by the application M at the runtime in the source cloud platform, such as, but not limited to databases, file storage, messaging brokers etc.

In an embodiment of the present invention, the target cloud platform 106 is configured to host a plurality of applications (app1, app2, app3, app(x), app(y) etc.) and managed backing services 106*a*, such as, but not limited to databases, file storage, and messaging brokers for at least one of: building, testing, deploying, managing, and updating software applications. In accordance with various embodiments of the present invention, the target cloud platform 106 is selected for migrating the application M from source cloud platform 104. In an embodiment of the present invention, the target cloud platform 106 interfaces with the cloud assessment and migration system 112 over the first communication channel 108 to provide data associated with backing services, such as, but not limited to databases, file storage, messaging brokers etc. associated with the target cloud platform 106. In another embodiment of the present invention, the data associated with backing services of the target cloud platform 106 is predefined in the cloud assessment and migration system 112. In accordance with various embodiments of the present invention, the target cloud platform 106 interfaces with the cloud assessment and migration system 112 to receive the application M for deployment and hosting.

In accordance with various embodiments of the present invention, the client computing device 110 may be a general purpose computer such as a desktop, a laptop, a smartphone and a tablet; a super computer; a microcomputer or any device capable of executing instructions, connecting to a network and sending/receiving data. In an embodiment of the present invention, the client computing device 110 is configured to interface with cloud assessment and migration system 112 via a second communication channel 108*a*. Examples of the second communication channel may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). In an embodiment of the present invention, a user module of the cloud assessment and migration system 112 may be installed onto the client computing device 110 to access the cloud assessment and migration system 112 via the second communication channel 108*a*.

In accordance with various embodiments of the present invention, the cloud assessment and migration system 112 may be a software executable by a computing device or a combination of software and hardware. In an embodiment of the present invention as shown in FIG. 1, the cloud assessment and migration system 112 is a software integrable/installable and executable via the client computing device 110 locally. In an embodiment of the present invention, the client computing device 110 is configured with a Graphical User Interface (GUI) of the cloud assessment and migration system 112 to at least provide inputs, select source cloud platform, select target cloud platform, input application M's source code address, generate migration readiness report, receive migration readiness report with recommendations, and migrate application M among other things. In an embodiment of the present invention where the cloud assessment and migration system 112 is a software integrable/installable and executable via the client computing device 110, a cloud profiler tool 112a associated with the cloud assessment and migration system 112 is provided on the client computing device 110 to retrieve runtime data associated with the application M from the source cloud platform 104.

In another embodiment of the present invention, the cloud assessment and migration system 112 is a combination of software and hardware. In an embodiment of the present invention, the cloud assessment and migration system 112 may be implemented in a client-server architecture, wherein the client computing device 110 accesses a server hosting the cloud assessment and migration system 112 over the second communication channel (108a). In an exemplary embodiment of the present invention, the functionalities of the cloud assessment and migration system 112 are delivered as Software as a Service (SAAS) to one or more client computing devices 110. In another embodiment of the present invention, the cloud assessment and migration system 112 may be implemented in a cloud computing architecture in which data, applications, services, and other resources are stored and delivered through shared datacenters. In an exemplary embodiment of the present invention, the cloud assessment and migration system 112 is a remote resource implemented over the cloud and accessible for shared usage in a distributed computing architecture by various client computing devices 110. In an exemplary embodiment of the present invention, the cloud assessment and migration system 112 may be accessed via an IP address/domain name via a web browser. In another exemplary embodiment of the present invention, the cloud assessment and migration system 112 may be accessed via a user module of the cloud assessment and migration system 112 executable on the client computing device 110.

In accordance with various embodiments of the present invention, the cloud assessment and migration system 112 is configured to interface with the code hosting platform 102, the source cloud platform 104 and the target cloud platform 106. In an embodiment of the present invention, the cloud assessment and migration system 112 is configured to interface with the code hosting platform 102 to retrieve source code of the application to be assessed and migrated (Application M). In an embodiment of the present invention, the cloud assessment and migration system 112 is configured to interface with the source cloud platform 104 to receive at least the runtime data associated with the application M. In an embodiment of the present invention, the runtime data includes, but is not limited to, CPU consumption of application M, memory consumed/requested, build packs used for hosting the application M, number of instances of the application M running on the source cloud platform, and data associated with backing services consumed by the application M at the runtime, such as, but not limited to databases, file storage, messaging brokers etc. In an embodiment of the present invention, the cloud assessment and migration system 112 is configured to interface with the target cloud platform 106 to receive data associated with backing services, such as, but not limited to databases, file storage, messaging brokers etc. associated with the target cloud platform 106. In accordance with various embodiments of the present invention, the cloud assessment and migration system 112 interfaces with the target cloud platform 106 to deploy and host the application M.

Figure 1A:
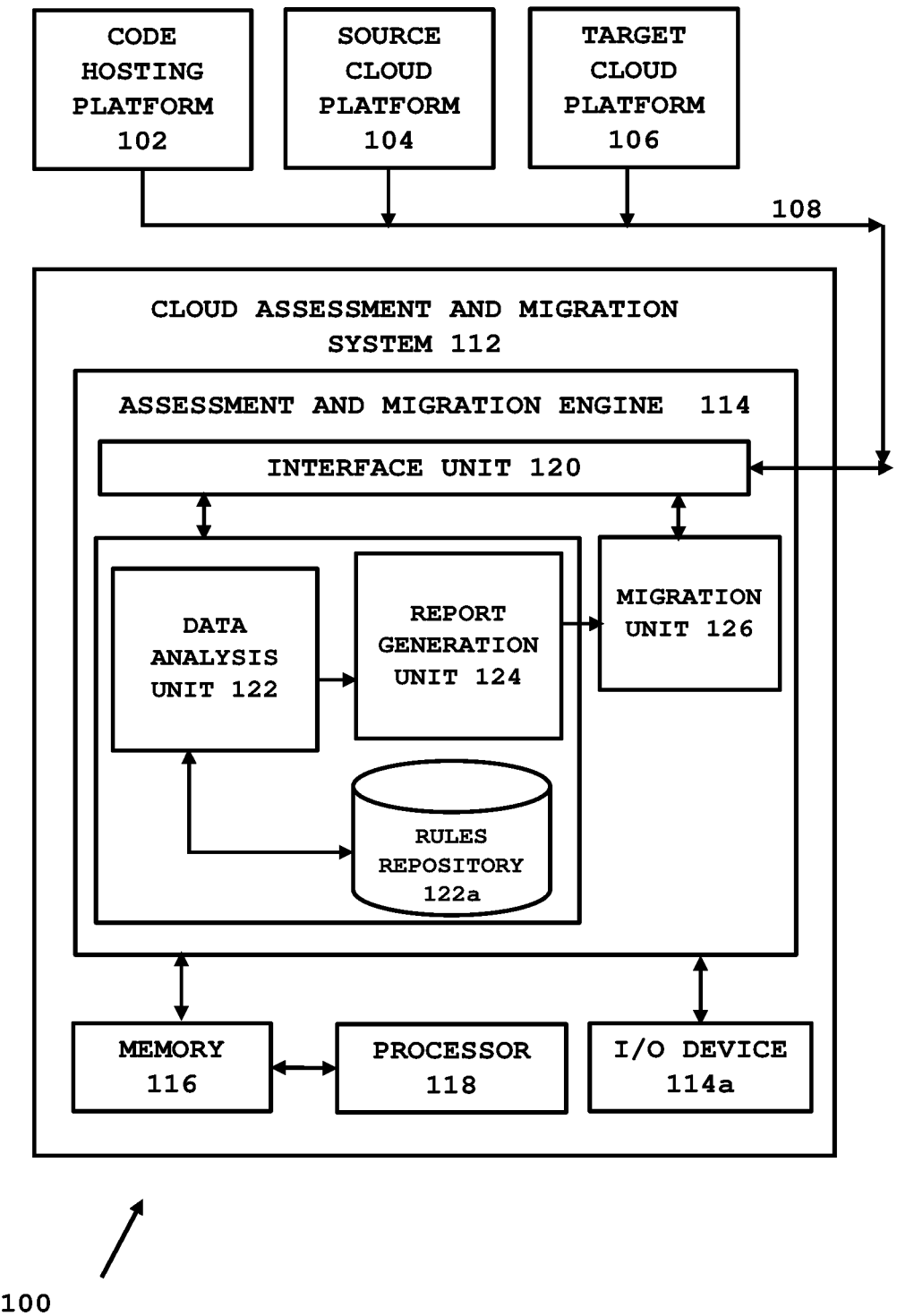
FIG. 1A illustrates a detailed block diagram of a system for application migration between cloud platforms, in accordance with various embodiments of the present invention.

Referring to FIG. 1A a detailed block diagram of a system for application migration between cloud platforms, is illustrated. In accordance with an embodiment of the present invention, the cloud assessment and migration system 112 comprises an assessment and migration engine 114, an Input/output (I/O) device 114a, a memory 116, and a processor 118. The assessment and migration engine 114 is operated via the processor 118 specifically programmed to execute instructions stored in the memory 116 for executing functionalities of the assessment and migration engine 114 in accordance with various embodiments of the present invention. In accordance with various embodiments of the present invention, the memory 116 may be a Random Access Memory (RAM), a Read-only memory (ROM), hard drive disk (HDD) or any other memory capable of storing data and instructions.

In accordance with various embodiments of the present invention, the assessment and migration engine 114 is a self-contained automated engine configured to retrieve complex data associated with the application, analyze said data to generate migration readiness report for the application, generate deployment configurations for migrating the application, update source code as per the target cloud platform, and migrate the application to the target cloud platform as per the deployment configuration.

In accordance with various embodiments of the present invention, the assessment and migration engine 114 comprises an interface unit 120, a data analysis unit 122, a rules repository 122a, a report generation unit 124, and a migration unit 126. The various units of the assessment and migration engine 114 are operated via the processor 118 specifically programmed to execute instructions stored in the memory 116 for executing respective functionalities of the multiple units (120, 122 122a, 124, and 126) in accordance with various embodiments of the present invention.

In accordance with various embodiments of the present invention, the interface unit 120 is configured to facilitate communication with the code hosting platform 102, the source cloud platform 104, the target cloud platform 106, the client computing device 110, and any other external resources (not shown). In an exemplary embodiment of the present invention, the external resources may include, but are not limited to, third party systems, such as hosting tools, computing resources, other cloud platforms, etc. In an embodiment of the present invention, the interface unit 120 is configured to provide communication with the I/O device 114a associated with the cloud assessment and migration system 112 for updating system configurations and receiving inputs from the user.

In an embodiment of the present invention, the interface unit 120 is configured with at least one of: a web gateway, a mobile gateway, a Graphical User Interface (GUI), an integration interface, a cloud profiler tool and a configuration interface, to facilitate integration and/or interfacing with the code hosting platform 102, the source cloud platform 104, the target cloud platform 106, the client computing device 110, I/O device 114a, and other external resources (not shown). In an exemplary embodiment of the present invention, the integration interface is configured with one or more APIs such as REST and SOAP APIs to facilitate smooth interfacing and/or integration with the code hosting platform 102, the target cloud platform 106 and the client computing device 110. In an exemplary embodiment of the present invention, the configuration interface provides communication with the Input/output device 114a for receiving administration configuration from system admins. In an exemplary embodiment of the present invention, the GUI provides communication with I/O device 114a and the client computing device 110 to receive inputs, such as, but not limited to, source cloud platform address, target cloud platform address, code hosting platform address and other data.

In an embodiment of the present invention, the GUI is accessible on the client computing device 110 to facilitate user interaction. In an exemplary embodiment of the present invention, the Graphical User Interface (GUI) allows a user to at least create login credentials, sign-in using the login credentials, input API end points of the code hosting platform 102, select application to be migrated (Application M), select source cloud platform 104, select one or more target cloud platforms, illustrate detailed migration readiness report, select deployment configuration templates as per the selected target cloud platform, and select migration settings amongst other things. In an embodiment of the present invention, the graphical user interface (GUI) associated with the interface unit 120 may be accessed from the client computing device 110 through a web gateway via a web browser. In another embodiment of the present invention, the GUI associated with the interface unit 120 may be accessed by mobile gateway using a user module installable on the client computing device 110.

In an embodiment of the present invention, the cloud profiler tool (112a of FIG. 1) associated with the interface unit 120 is configured to facilitate interaction with the selected source cloud platform 104. In an exemplary embodiment of the present invention, the cloud profiler tool 112a is a command line spring boot application which uses cloud foundry client library software development kit (SDK). In an embodiment of the present invention, the cloud profiler tool 112a associated with the interface unit 120 may be accessed from the client computing device 110 through a web gateway via a web browser. In another embodiment of the present invention, the cloud profiler tool 112a associated with the interface unit 120 is executed on the client-computing device 110 via a user module of the cloud assessment and migration system 112 installable on the client computing device 110. In an embodiment of the invention, where the cloud assessment and migration system 112 is a software installable and executable by the client-computing device 110, the interface unit 120 including at least the cloud profiler tool 112a, along with other units of the assessment and migration engine 114 are locally accessible on the client-computing device 110.

In accordance with various embodiments of the present invention, the interface unit 120 is configured to retrieve analysis-data including, but not limited to, source code of the application to be assessed and migrated, source cloud platform data, and target cloud platform data.

In accordance with various embodiments of the present invention, the interface unit 120 is configured to retrieve the source code of the application to be assessed and migrated (Application M) from the code hosting platform 102. In an embodiment of the present invention, the path for application source code is received from the user via the I/O device 114a or the client computing device 110, and subsequently, the application source code is retrieved for analysis. In an exemplary embodiment of the present invention, where the code hosting platform 102 is a GitHub platform, and a GitHub path is received as an input to retrieve source code. In an embodiment of the present invention, the source code of the application M is retrieved in a zip file format.

In accordance with various embodiments of the present invention, the interface unit 120 is configured to retrieve source cloud platform data by accessing the source cloud platform 104 via the cloud profiler tool 112a. In operation, the API endpoint details of the source cloud platform 104, name of the application which is to be migrated (application M), and/or access credentials of the source cloud platform 104 are received via the I/O device 114a or the client-computing device 110. In an exemplary embodiment of the invention, the API end points details, name of the application M, and/or access credentials of the source cloud platform 104 are provided by a user via the I/O device 114a or the client-computing device 110. Further, the cloud profiler tool 112a is configured to retrieve the source cloud platform data by accessing the source cloud platform 104 using the API ends points and/or credentials. In an exemplary embodiment of the present invention, the retrieved source cloud data is in the form of a JSON file. In an exemplary embodiment of the present invention, the retrieved source cloud platform data includes, but is not limited to, runtime data associated with the application M and other data associated with application M. In an embodiment of the present invention, the runtime data includes, but is not limited to, CPU consumption of application M, memory consumed/requested, build packs used for hosting the application M, number of instances of the application M running on the source cloud platform, and data associated with backing services consumed by the application M at the runtime, such as, but not limited to databases, file storage, messaging brokers etc.

In accordance with various embodiments of the present invention, the interface unit 120 is configured to retrieve target cloud platform data, including at least the data associated with backing services, such as, but not limited to databases, file storage, messaging brokers etc. associated with the target cloud platform 106. In operation, in an embodiment of the present invention, the interface unit 120 is configured to receive API endpoint details, and/or access credentials of the target cloud platform 106 from the user via the I/O device 114a or the client-computing device 110. Further, the interface unit 120 is configured to retrieve the target cloud platform data by accessing the target cloud platform 106 using the API ends points and/or credentials. In another embodiment of the present invention, the interface unit 120 is configured to receive the name of the target cloud platform from a user via the I/O device 114a or the client-computing device 110. Further, the interface unit 120 is configured to retrieve target cloud platform data from a pre-defined database (not shown).

In accordance with various embodiments of the present invention, the data analysis unit 122 is configured to receive the analysis-data including, but not limited to, source code of the application to be assessed and migrated, source cloud platform data, and target cloud platform data from the interface unit 120. In accordance with various embodiments of the present invention, the data analysis unit 122 is configured to evaluate migration parameters based on the retrieved analysis-data. In particular, the migration parameters are evaluated based on a source code of the application, runtime data associated with the application extracted from the source cloud platform data, and the target cloud platform data. In an embodiment of the present invention, the migration parameters include, but are not limited to, cloud impediments associated with the application, tech-stack suitability score, anti-patterns associated with the application, migration complexity score associated with the application, and equivalent backing services associated with the target cloud platforms. In an embodiment of the present invention, tech-stack suitability score is representative of cumulative score of suitability of tech-stacks deployed on the source cloud platform in relation to the target cloud platform. In an embodiment of the present invention, the data analysis unit 122 is configured to evaluate migration parameters by analyzing the retrieved application source code, source cloud platform data, and target cloud platform data using one or more analysis techniques.

In an embodiment of the present invention, the data analysis unit 122 is configured to evaluate cloud impediments, tech-stack suitability score, and anti-patterns by analyzing the source code using static code analysis techniques based on a predefined set of rules. In an embodiment of the present invention, the predefined set of rules are regular expression rules (regex rules) categorized into, but not limited to, anti-pattern regex rules, tech-stack suitability evaluation regex rules, tech-stack summary regex rules, impediment identification regex rules, and backing services recommendation rules. In operation, each file in the retrieved source code zip folder is analyzed to identify file-extensions to be analyzed for evaluating the cloud impediments, the tech-stack suitability score, and the anti-patterns. Further, each of the extracted file-extensions are analyzed using predefined set of regex rules including anti-pattern regex rules, Tech stack suitability evaluation regex rules, tech stack summary regex rules, impediment identification regex rules to evaluate anti-patterns, tech stack suitability and cloud impediments. In an exemplary embodiment of the present invention, each category of regex rules is configured to identify one or more predefined patterns associated with respective migration parameters, as a part of the content of the extracted file-extensions of the source code. In an embodiment of the present invention, the predefined set of rules are maintained in the rules repository 122a. In accordance with various embodiments of the present invention, the rules repository 122a is any storage capable of maintaining data. In accordance with another embodiment of the present invention, each category of the predefined set of rules may be stored and maintained in individual repositories.

In an exemplary embodiment of the present invention, the cloud impediments associated with the application M are evaluated by identifying one or more predetermined impediment-patterns within the extracted file-extensions of the source code of application M using impediment identification regex rules from the predefined set of regex rules. Further, the cloud impediments are evaluated based on the identified one or more impediment-patterns using predefined impediment mapping table comprising cloud impediments mapped with respective impediment-patterns.

In an embodiment of the present invention, evaluating the tech-stack suitability score comprises identification of one or more predetermined tech-stack patterns within the extracted file-extensions of the source code using tech-stack suitability evaluation regex rules. Further, one or more tech-stacks consumed by the application M in the source cloud platform are evaluated based on the identified one or more tech-stack patterns using a predefined tech-stack mapping table (not shown). In an exemplary embodiment of the present invention, the predefined tech-stack mapping table comprises the one or more tech-stacks mapped with respective tech-stack patterns. Furthermore, a weightage associated with each of the evaluated tech-stacks is determined depending on the suitability of respective evaluated tech-stacks with the selected target cloud platform 106. Finally, a cumulative score of weightage of each of the evaluated tech-stacks is computed, where the cumulative score is representative of the tech-stack suitability score.

In an embodiment of the present invention, evaluating the anti-patterns associated with the application M comprises identifying one or more predetermined anti-pattern expressions within the source code of the application M. Further, the anti-patterns are evaluated based on the identified one or more anti-pattern expressions using a predefined anti-pattern mapping table (not shown) comprising the one or more anti-patterns mapped with respective anti-pattern expressions. Further, the evaluated anti-patterns are categorized into a plurality of categories based on the complexity of the identified one or more anti-pattern expressions. In an exemplary embodiment of the present invention, the plurality of categories include rehost, replatform, refactor and rebuild. In an exemplary embodiment of the present invention, the category rehost comprises anti-patterns having least complexity in migration, the category replatform comprises anti-patterns having medium complexity in migration, the category refactor comprises anti-patterns having high complexity in migration, and rebuild comprises anti-patterns having a very high complexity in migration. In an exemplary embodiment of the present invention, the identified migration parameters including cloud impediments, tech-stack suitability score, and anti-patterns are summarized in a JSON format, hereinafter referred to as JSON 2 file.

In accordance with various embodiments of the present invention, the data analysis unit 122 is configured to evaluate a migration complexity score associated with the application M based on at least one of: the evaluated anti-patterns and the cloud impediments. In a preferred embodiment of the present invention, the data analysis unit 122 is configured to evaluate the migration complexity score based on the evaluated anti-patterns. In accordance with various embodiments of the present invention, the migration complexity score is a parameter representative of the complexity associated in migrating the application M from source cloud platform 104 to the target cloud platform 106. In operation, a complexity weightage associated with each of the evaluated anti-patterns is evaluated based on a predefined complexity mapping table (not shown). The predefined complexity mapping table comprising anti-patterns and their respective complexity weightage. Further, a cumulative weightage score of the computed complexity weightage of each of the evaluated anti-patterns is determined, where the cumulative weightage score is representative of migration complexity score. In an embodiment of the present invention, a low migration complexity score is considered good for migration.

The data analysis unit 122 is further configured to assess migration readiness based on the evaluated migration parameters. In an embodiment of the present invention, the data analysis unit 122 is configured to assess migration readiness based on at least the migration parameters including tech-stack suitability, anti-patterns and migration complexity score. In an exemplary embodiment of the present invention, a value of each of the parameters including the tech-stack suitability score and the migration complexity score within a preset threshold, and the anti-patterns in one or more predefined categories, rehost, refactor and replatform is indicative that the application M may be considered ready for migration.

In accordance with various embodiments of the present invention, the data analysis unit 122 is configured to evaluate the equivalent backing services associated with the target cloud platform 106 based on the backing services consumed by application M in the source cloud platform 104. In an embodiment of the present invention, evaluating the equivalent backing services associated with the target cloud platform 106 comprises extracting backing services such as, but not limited to databases, file storage, messaging brokers etc. consumed by the application M in the source cloud platform 104 by analyzing the runtime data from the source cloud platform data. Further, the equivalent backing services associated with the target cloud platform 106 are evaluated by analyzing the target cloud platform data based on the extracted backing services using backing service recommendation rules.

In accordance with various embodiments of the present invention, the report generation unit 124 is configured to receive the evaluated migration parameters, the migration readiness assessment and the runtime data from the data analysis unit 122. In particular, the report generation unit is configured to receive the migration readiness assessment and the migration parameters, including cloud impediments, tech-stack suitability score, anti-patterns, migration complexity score, and backing services consumed by application M in the source cloud platform 104 and equivalent backing services in the target cloud platforms.

In accordance with various embodiments of the present invention, the report generation unit 124 is configured to generate a migration readiness report based on the evaluated migration parameters, migration readiness assessment and the runtime data of application M consumed in the source cloud platform. In an embodiment of the present invention, the migration readiness report comprises at least the cloud design patterns used in the source cloud platform 104, runtime data of application M, equivalent backing services in the target cloud platform 106, tech-stacks consumed by application M in the source cloud platform and their suitability for migration, tech-stack suitability score, detailed summary of anti-patterns and cloud impediments for the application migration, migration complexity score, and migration recommendations, such as rehost, replatform, refactor, rebuild. As already described above, the runtime data of application M includes, the CPU consumption of application M, memory consumed/requested by application M, build packs used for hosting the application M, number of instances of the application M running on the source cloud platform, and data associated with backing services consumed by the application M in the source cloud platform 104 at the runtime, such as, but not limited to databases, file storage, messaging brokers etc. In an exemplary embodiment of the present invention, the migration readiness report may be in any of the formats selected from pdf, html and JSON. In an embodiment of the present invention, the migration readiness report is provided to the user via the interface unit 120.

In accordance with various embodiments of the present invention, the migration unit 126 is configured to receive the migration readiness report from the report generation unit 124. In accordance with various embodiments of the present invention, the migration unit 126 is configured to receive the source cloud platform data and the target cloud platform data from the data analysis unit 122. Further, the migration unit 126 is configured to generate deployment configurations for the application M as per the target cloud platform if respective values of the tech-stack suitability score and the migration complexity score are within a preset threshold, and the anti-patterns are in one or more categories refactor and replatform. In an exemplary embodiment of the present invention, a tech-stack suitability score above 70 out of 100 is considered good for migration. In an exemplary embodiment of the present invention, a migration complexity score below 30 out of 100 is considered good for migration. In another embodiment of the present invention, the migration unit 126 is configured to generate deployment configurations for the application M as per the target cloud platform based on user discretion.

In an embodiment of the present invention, the deployment configurations for application M as per the target cloud platform 106 are generated by incorporating runtime data of application M and equivalent backing services in target platform from the migration readiness report into pre-configured deployment templates. In an embodiment of the present invention, the pre-configured deployment templates include, but are not limited to, deployment yaml templates, configMap yaml template, service yaml internal template and service yaml external templates. In an embodiment of the present invention, the pre-configured deployment templates are maintained in a database (not shown). In an exemplary embodiment of the present invention, each of the deployment temples are customizable and support Kubernetes based cloud platforms. In another embodiment of the present invention, the pre-configured templates may be customized and uploaded by the user via the GUI as per the migration requirements. In an embodiment of the present invention, the pre-configured templates comprise one or more placeholders.

In operation, the migration unit 126 is configured to generate the deployment configurations as per the target cloud platform by selecting a pre-configured deployment template as per the target cloud platform. Further, a value of each of one or more placeholders associated with the selected pre-configured deployment template are evaluated based on the runtime data of the application and equivalent backing services of the target cloud platform from the migration readiness report. In another embodiment of the present invention, the values of each of the one or more placeholder are evaluated using the runtime data of the application M retrieved from the source cloud platform data, and equivalent backing services retrieved from the target cloud platform data. Further, the evaluated values are incorporated in the one or more placeholders. In another embodiment of the present invention, the values associated with one or more placeholders are received from a user.

In an embodiment of the present invention, the pre-configured templates comprise two types of placeholders, including generic place holders and system placeholders. In operation, each string wrapped with symbol "#$" is considered as a placeholder. In an exemplary embodiment of the present invention, the migration unit 126 is configured to receive the values for replacing the generic placeholders from the user. In particular, each string of generic placeholders wrapped with symbol "#$" is prompted to the user for receiving input values during generation of the deployment configurations as per the target cloud platform 106. An example of generic placeholder in a configuration yaml template is #$server-name #$, where server-name is prompted to the user and value provided by user is replaced in the template.

In an exemplary embodiment of the present invention, the migration unit 126 is configured to port the system placeholders automatically from the runtime data of application M into the pre-configured templates. Examples of system placeholder in a deployment yaml template include, but are not limited to, #$!app-name!$ # to substitute app-name, #$!memory-request!$ # to substitute the memory-request, #$!memory-limit!$ # to substitute memory-limit, and #$!numberofInstances!$ # to substitute the number of replicas of the application.

In accordance with various embodiments of the present invention, the migration unit 126 is configured to migrate the application M to the target cloud platform based on the generated deployment configurations. In accordance with various embodiments of the present invention, the migration unit 126 is configured to transform the application source code as per the target cloud platform 106. In operation, new files and pieces of code are inserted into the application source code based on the migration readiness report. Further, the application M is migrated to the target cloud platform by creating Continuous Integration/Continuous Deployment (CI/CD) pipeline using the generated deployment configurations and the transformed application code.

Advantageously, the system of the present invention, readily generates migration readiness report based on several migration parameters. The system of the present invention further, provides migration strategy and recommendations. Further, the system of the present invention, automatically creates deployment configurations as per the target platform. Furthermore, the system of the present invention, provides easy migration from the source cloud platform to the target cloud platform.

Figure 2:
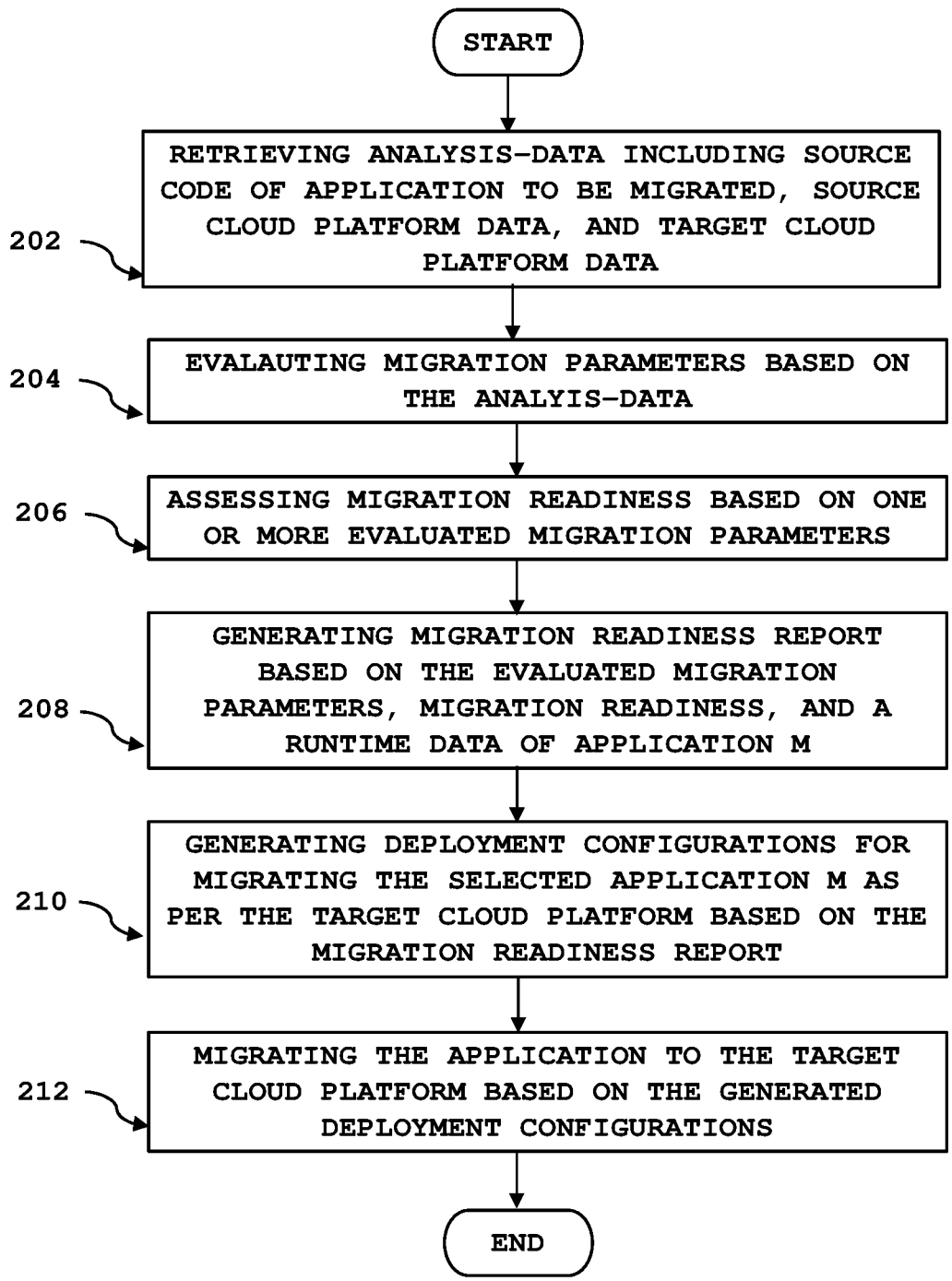
FIG. 2 is a flowchart illustrating a method for application migration between cloud platforms, in accordance with various embodiments of the present invention.

Referring to FIG. 2, a flowchart illustrating a method for application migration between cloud platforms is shown in accordance with various embodiments of the present invention.

At step 202, analysis-data is retrieved. In an embodiment of the present invention, the analysis-data includes, but is not limited to, source code of the application to be assessed and migrated, source cloud platform data, and target cloud platform data. In accordance with various embodiments of the present invention, the source code of the application to be assessed and migrated referred to as Application M is retrieved from a code hosting platform (102 of FIG. 1). In an embodiment of the present invention, the path for application source code is received from the user via an I/O device or the client computing device (110 of FIG. 1), and subsequently, the application source code is retrieved for analysis. In an exemplary embodiment of the present invention, where the code hosting platform is a GitHub platform, a GitHub path is received as an input to retrieve source code. In an embodiment of the present invention, the source code of the application M is retrieved in a zip format.

In accordance with various embodiments of the present invention, the source cloud platform data is retrieved by accessing a selected source cloud platform. In an exemplary embodiment of the present invention, the source cloud platform data is retrieved by executing a cloud profiler tool (112a of FIG. 1) against the selected source cloud platform (104 of FIG. 1). In an exemplary embodiment of the present invention, the cloud profiler tool is provided on a client-computing device to retrieve source cloud platform data. The cloud profiler tool is a command line spring boot application which uses cloud foundry client library software development kit (SDK). In operation, the API endpoint details of the source cloud platform, name of the application which is to be migrated (application M), and/or access credentials of the source cloud platform 104 are received from a user via an I/O device or the client-computing device. Further, the source cloud platform data is retrieved by accessing the source cloud platform 104 via the cloud profiler tool (112a of FIG. 1) using the API ends points and/or credentials. In an exemplary embodiment of the present invention, the retrieved source cloud data is in the form of a JSON file. In an embodiment of the present invention, the retrieved source cloud platform data includes, but is not limited to, runtime data associated with the application M and other data associated with application M. In an embodiment of the present invention, the runtime data includes, but is not limited to, CPU consumption of application M in the source cloud platform, memory consumed/requested by the application M in the source cloud platform, build packs used for hosting the application M in the source cloud platform, number of instances of the application M running on the source cloud platform, and data associated with backing services consumed by the application M at the runtime in the source cloud platform, such as, but not limited to databases, file storage, messaging brokers etc.

In accordance with various embodiments of the present invention, the target cloud platform data is retrieved by accessing a selected target cloud platform. In accordance with various embodiments of the present invention, the target cloud platform data, includes at least the data associated with backing services, such as, but not limited to databases, file storage, messaging brokers etc. associated with the target cloud platform 106. In operation, in an embodiment of the present invention, the API endpoint details, and/or access credentials of the target cloud platform 106 are received from a user via the I/O device (114a of FIG. 1) or the client-computing device (110 of FIG. 1). Further, the target cloud platform data is retrieved by accessing the target cloud platform 106 using the API ends points and/or credentials. In another embodiment of the present invention, the name of the target cloud platform is received from a user via the I/O device 114a or the client-computing device 110. Further, the target cloud platform data is retrieved from a pre-defined database (not shown).

At step 204, migration parameters are evaluated based on the retrieved analysis data. In particular, the migration parameters are evaluated based on a source code of the application, the runtime data associated with the application extracted from the source cloud platform data, and the target cloud platform data. In an embodiment of the present invention, the migration parameters include, but are not limited to, cloud impediments associated with the application, tech-stack suitability score, anti-patterns associated with the application, migration complexity score associated with the application, and equivalent backing services associated with the target cloud platforms. In an embodiment of the present invention, the tech-stack suitability score is representative of cumulative score of suitability of tech-stacks deployed on the source cloud platform (104 of FIG. 1) in relation to the target cloud platform (106 of FIG. 1). In an embodiment of the present invention, the migration parameters are evaluated by analyzing the retrieved application source code, the source cloud platform data, and the target cloud platform data using one or more analysis techniques.

In an embodiment of the present invention, the migration parameters including the cloud impediments, the tech-stack suitability score, and the anti-patterns are evaluated by analyzing the source code of the application using static code analysis techniques based on a predefined set of rules. In an embodiment of the present invention, the predefined set of rules are regular expression rules (regex rules) categorized into, but not limited to, anti-pattern regex rules, tech stack suitability evaluation regex rules, tech stack summary regex rules, impediment identification regex rules, and backing services recommendation rules. In operation, each file in the retrieved source code zip folder is analyzed to identify file-extensions to be analyzed for evaluating the cloud impediments, the tech-stack suitability score, and the anti-patterns. Further, each of the extracted file-extensions are analyzed using predefined set of regex rules including anti-pattern regex rules, Tech stack suitability evaluation regex rules, tech stack summary regex rules, impediment identification regex rules to evaluate anti-patterns, tech stack suitability and cloud impediments. In an exemplary embodiment of the present invention, each category of regex rules is configured to identify one or more predefined patterns associated with respective migration parameters, as a part of the content of the extracted file-extensions of the source code. In an embodiment of the present invention, the predefined set of rules are maintained in a rules repository (122a of FIG. 1). In accordance with various embodiments of the present invention, the rules repository 122a is any storage capable of maintaining data. In accordance with another embodiment of the present invention, each category of the predefined set of rules may be stored and maintained in individual repositories.

In an exemplary embodiment of the present invention, the cloud impediments associated with the application M are evaluated by identifying one or more predetermined impediment-patterns within the extracted file-extensions of the source code of application M using impediment identification regex rules from the predefined set of regex rules. Further, the cloud impediments are evaluated based on the identified one or more impediment-patterns using predefined impediment mapping table comprising cloud impediments mapped with respective impediment-patterns.

In an embodiment of the present invention, evaluating the tech-stack suitability score comprises identification of one or more predetermined tech-stack patterns within the extracted file-extensions of the source code using tech-stack suitability evaluation regex rules. Further, one or more tech-stacks consumed by the application M in the source cloud platform are evaluated based on the identified one or more tech-stack patterns using a predefined tech-stack mapping table (not shown). In an exemplary embodiment of the present invention, the predefined tech-stack mapping table comprises the one or more tech-stacks mapped with respective tech-stack patterns. Furthermore, a weightage associated with each of the evaluated tech-stacks is determined depending on the suitability of respective evaluated tech-stacks with the selected target cloud platform. Finally, a cumulative score of weightage of each of the evaluated tech-stacks is computed, where the cumulative score is representative of the tech-stack suitability score.

In an embodiment of the present invention, evaluating the anti-patterns associated with the application M comprises identifying one or more predetermined anti-pattern expressions within the source code of the application M. Further, the anti-patterns are evaluated based on the identified one or more anti-pattern expressions using a predefined anti-pattern mapping table (not shown) comprising the one or more anti-patterns mapped with respective anti-pattern expressions. Further, the evaluated anti-patterns are categorized into a plurality of categories based on the complexity of the identified one or more anti-pattern expressions. In an exemplary embodiment of the present invention, the plurality of categories include rehost, replatform, refactor and rebuild. In an exemplary embodiment of the present invention, the category rehost comprises anti-patterns having least complexity in migration, the category replatform comprises anti-patterns having medium complexity in migration, the category refactor comprises anti-patterns having high complexity in migration, and rebuild comprises anti-patterns having a very high complexity in migration. In an exemplary embodiment of the present invention, the identified migration parameters including cloud impediments, tech-stack suitability score, and anti-patterns are summarized in a JSON format, hereinafter referred to as JSON 2 file.

In accordance with various embodiments of the present invention, the migration complexity score is a parameter representative of the complexity associated in migrating the application M from source cloud platform to the target cloud platform. In accordance with various embodiments, a migration complexity score associated with the application M is evaluated based on at least one of: the evaluated anti-patterns and the cloud impediments. In a preferred embodiment of the present invention, the migration complexity score is evaluated based on the evaluated anti-patterns. In operation, a complexity weightage associated with each of the evaluated anti-patterns is evaluated based on a predefined complexity mapping table (not shown). The predefined complexity mapping table comprising anti-patterns and their respective complexity weightage. Further, a cumulative weightage score of the computed complexity weightage of each of the evaluated anti-patterns is determined, where the cumulative weightage score is representative of migration complexity score. In an embodiment of the present invention, a low migration complexity score is considered good for migration.

In accordance with various embodiments of the present invention, the equivalent backing services associated with the target cloud platform are evaluated based on the backing services consumed by application M in the source cloud platform. In an embodiment of the present invention, evaluating the equivalent backing services associated with the target cloud platform comprises extracting backing services such as, but not limited to databases, file storage, messaging brokers etc. consumed by the application in the source cloud platform by analyzing the runtime data from the source cloud platform data. Further, the equivalent backing services associated with the target cloud platform are evaluated by analyzing the target cloud platform data based on the extracted backing services using backing service recommendation rules.

At step 206, migration readiness for application M to the selected target cloud platform is assessed based on one or more evaluated migration parameters. In an embodiment of the present invention, the migration readiness is assessed based on the migration parameters including the tech stack suitability score, anti-patterns and migration complexity score. In an exemplary embodiment of the present invention, a value of each of the parameters including the tech-stack suitability score and the migration complexity score within a preset threshold, and the anti-patterns in one or more predefined categories, rehost, refactor and replatform is indicative that the application M may be considered ready for migration.

At step 208, a migration readiness report is generated based on the evaluated migration parameters, the migration readiness assessment and the runtime data of application M consumed at runtime in the source cloud platform. In an embodiment of the present invention, the migration readiness report comprises at least the cloud design patterns used in the source cloud platform 104, runtime data of application M, equivalent backing services associated with the target cloud platform 106, tech-stacks consumed by application M in the source cloud platform and their suitability for migration, tech-stack suitability score, a detailed summary of anti-patterns and cloud impediments for the application migration, migration complexity score, and migration recommendations, such as replatform, refactor, rehost, and rebuild. As already described above, the runtime data of application M includes, the CPU consumption of application M in the source cloud platform, memory consumed/requested by application M in the source cloud platform, build packs used for hosting the application M in the source cloud platform, number of instances of the application M running on the source cloud platform, and data associated with backing services consumed by the application M in the source cloud platform 104 at the runtime, such as, but not limited to databases, file storage, messaging brokers etc. In an exemplary embodiment of the present invention, the migration readiness report may be in any of the formats selected from pdf, html and JSON. In an embodiment of the present invention, the migration readiness report is provided to the user.

At step 210, deployment configurations for migrating application M are generated as per the target cloud platform based on migration readiness report. In an embodiment of the present invention, the deployment configurations for application M as per the target cloud platform are generated if respective values of the tech-stack suitability score and the migration complexity score are within a preset threshold, and the anti-patterns are in one or more categories refactor and replatform. In an exemplary embodiment of the present invention, a tech-stack suitability score above 70 out of 100 is considered good for migration. In an exemplary embodiment of the present invention, a migration complexity score below 30 out of 100 is considered good for migration. In another embodiment of the present invention, the deployment configurations for the application M as per the target cloud platform are generated based on user discretion.

In an embodiment of the present invention, the deployment configurations for application M as per the target cloud platform are generated by incorporating runtime data of application M and equivalent backing services of the target platform from the migration readiness report into pre-configured deployment templates. In an embodiment of the present invention, the pre-configured templates comprise one or more placeholders. In an embodiment of the present invention, the pre-configured deployment templates include, but are not limited to, deployment yaml templates, configMap yaml template, service yaml internal template and service yaml external templates. In an embodiment of the present invention, the pre-configured deployment templates may be maintained in a database. In an exemplary embodiment of the present invention, each of the deployment temples are customizable and support Kubernetes based cloud platforms. In another embodiment of the present invention, the pre-configured templates may be customized and uploaded by the user as per the migration requirements.

In operation, generating the deployment configurations as per the target cloud platform comprises, selecting a pre-configured deployment template as per the target cloud platform. Further, a value of each of one or more placeholders associated with the selected pre-configured deployment template are evaluated based on the runtime data of the application and equivalent backing services of the target cloud platform from the migration readiness report. In another embodiment of the present invention, the values of each of the one or more placeholder are evaluated using the runtime data of the application M retrieved from the source cloud platform data, and equivalent backing services retrieved from the target cloud platform data. Further, the evaluated values are incorporated in the one or more placeholders. In another embodiment of the present invention, the values associated with one or more placeholders are received from a user.

In an embodiment of the present invention, each string wrapped with symbol "#$" is considered as a placeholder. In an embodiment of the present invention, the pre-configured templates comprise two types of placeholders, including generic place holders and system placeholders. In an exemplary embodiment of the present invention, values for replacing the generic placeholders are received from the user. In particular, each string of generic placeholders wrapped with symbol "#$" is prompted to the user for receiving input values during generation of the deployment configurations as per the target cloud platform. An example of generic placeholder in a configuration yaml template is #$server-name #$, where server-name is prompted to the user and value provided by user is replaced in the template.

In an exemplary embodiment of the present invention, the system placeholders are automatically ported from the runtime data of application M into the pre-configured templates. Examples of system placeholder in a deployment yaml template include, but are not limited to, #$!app-name!$ # to substitute app-name, #$!memory-request!$ # to substitute the memory-request, #$!memory-limit!$ # to substitute memory-limit, and #$!numberofInstances!$ # to substitute the number of replicas of the application.

At step 212, the application M is migrated to the target cloud platform based on the generated deployment configurations. In accordance with various embodiments of the present invention, the application source code is transformed as per the target cloud platform 106. In operation, new files and pieces of code are inserted into the application source code based on the migration readiness report. Further, the application M is migrated to the target cloud platform by creating Continuous Integration/Continuous Deployment (CI/CD) pipeline using the generated deployment configurations and the transformed application code.

Advantageously, the method of the present invention, readily facilitates generation of an accurate migration readiness report by consuming several migration parameters. The method of the present invention further, provides migration strategy and recommendations along with the migration readiness report. Further, the method of the present invention, automatically creates deployment configurations as per the target platform. Furthermore, the method of the present invention, provides easy migration from the source cloud platform to the target cloud platform.

Figure 3:
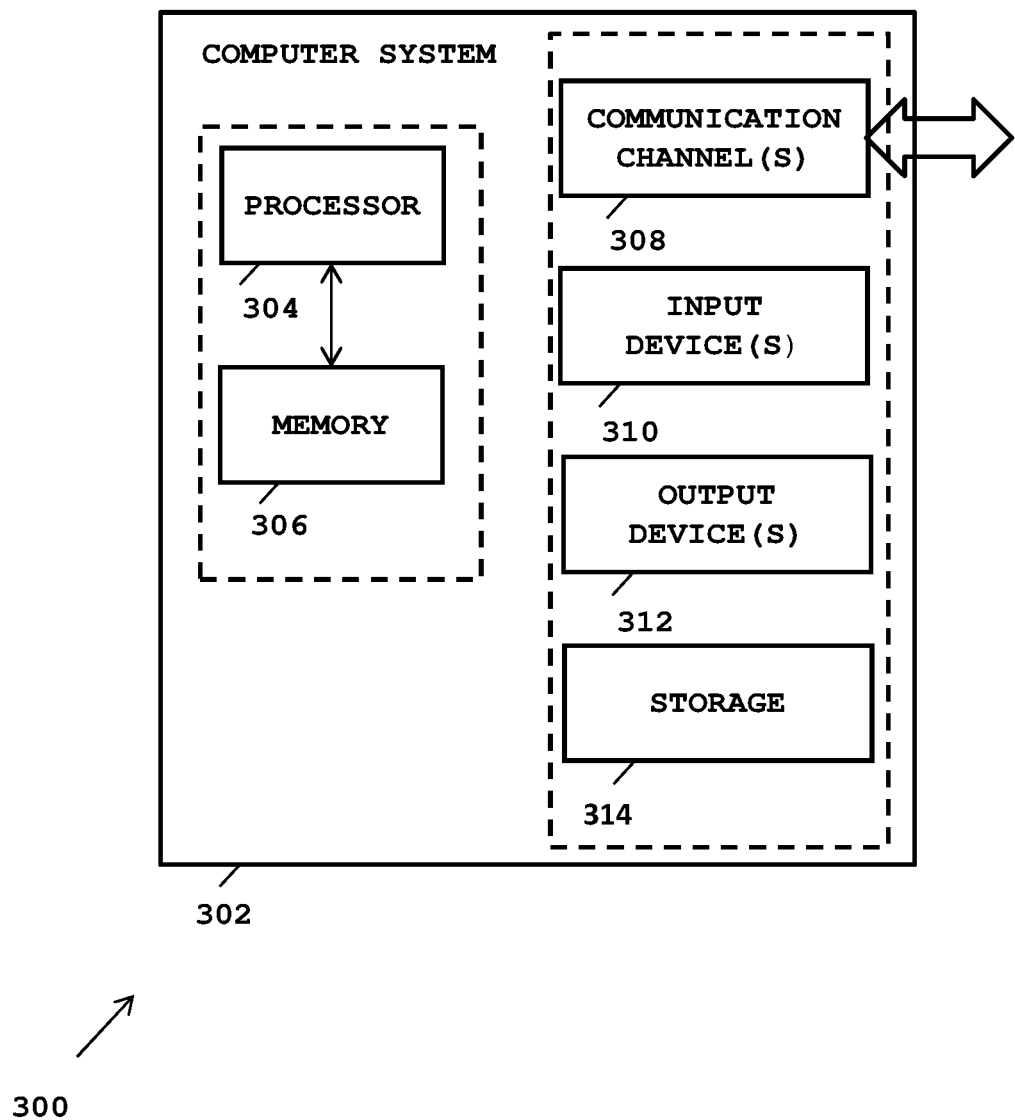
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for migrating an application from a source cloud platform to a target cloud platform, wherein the method is implemented by a processor executing program instructions stored in a memory, the method comprising: evaluating, by the processor, migration parameters based on a source code of the application, a runtime data associated with the application and a target cloud platform data, wherein the migration parameters include cloud impediments associated with the application, a tech-stack suitability score, anti-patterns associated with the application, a migration complexity score associated with the application, and equivalent backing services associated with the target cloud platform, and wherein evaluating the anti-patterns associated with the application comprises:

identifying one or more predetermined anti-pattern expressions within the source code of the application;

evaluating the anti-patterns based on the identified one or more anti-pattern expressions using a predefined anti-pattern mapping table comprising the one or more anti-patterns mapped with respective anti-pattern expressions; and categorizing the evaluated anti-patterns into a plurality of categories comprising rehost, replatform, and rebuild based on complexity of the identified one or more anti-pattern expressions;

assessing, by the processor, a migration readiness of the application to the target cloud platform based on one or more evaluated migration parameters;

generating, by the processor, a migration readiness report based on the evaluated migration parameters, the assessed migration readiness and the runtime data of the application;

generating, by the processor, deployment configurations as per the target cloud platform for migrating the application based on the migration readiness report, and wherein the deployment configurations as per the target cloud platform are generated if respective values of the tech-stack suitability score and the migration complexity score are within a preset threshold, and the anti-patterns are in one or more categories refactor and replatform; and migrating, by the processor, the application from the source cloud platform to the target cloud platform based on the generated deployment configurations.

2. The method as claimed in claim 1, wherein the runtime data of the application is retrieved from the source cloud platform, the runtime data comprises CPU consumption of the application in the source cloud platform, memory consumed or requested by the application in the source cloud platform, build packs used for hosting the application in the source cloud platform, number of instances of the application running on the source cloud platform, and backing services consumed by the application at the runtime in the source cloud platform.

3. The method as claimed in claim 2, wherein retrieving the runtime data of the application from the source cloud platform comprises: receiving API endpoint details of the source cloud platform and at least one of: name of the application and access credentials of the source cloud platform; and accessing the source cloud platform based on the API endpoint details and at least one of: name of the application and access credentials of the source cloud platform via a cloud profiler tool.

4. The method as claimed in claim 1, wherein the target cloud platform data comprises at least the backing services associated with the target cloud platform, further wherein the target cloud platform data is retrieved from at least on of: the target cloud platform and a database based on a name of the target cloud platform.

5. The method as claimed in claim 1, wherein evaluating the cloud impediments associated with the application comprises, identifying one or more predetermined impediment patterns within the source code of application using impediment identification regex rules from a predefined set of regex rules; and evaluating the cloud impediments based on the identified one or more impediment-patterns using predefined impediment mapping table comprising cloud impediments mapped with respective impediment-patterns.

6. The method as claimed in claim 1, wherein the tech-stack suitability score is representative of a cumulative score of suitability of tech-stacks deployed on the source cloud platform in relation to the target cloud platform, wherein evaluating the tech-stack suitability score comprises:
identifying one or more predetermined tech-stack patterns within the source code of the application using tech-stack suitability evaluation regex rules from a predefined set of regex rules;
evaluating one or more tech-stacks consumed by the application in the source cloud platform based on the identified one or more tech-stack patterns using a predefined tech-stack mapping table comprising the one or more tech-stacks mapped with respective tech-stack patterns;
determining a weightage associated with each of the evaluated tech-stacks depending on the suitability of respective evaluated tech-stacks with the selected target cloud platform; and
computing a cumulative score of weightage of each of the evaluated tech-stacks.

7. The method as claimed in claim 1, wherein the category rehost comprises anti-patterns having least complexity in migration, the category replatform comprises anti-patterns having medium complexity in migration, the category refactor comprises anti-patterns having high complexity in migration, and rebuild comprises anti-patterns having a very high complexity in migration.

8. The method as claimed in claim 1, wherein the migration complexity score associated with the application is representative of complexity associated in migrating the application from source cloud platform to the target cloud platform, said migration complexity score is evaluated based on the evaluated anti-patterns by: computing a complexity weightage associated with each of the evaluated anti-patterns based on a predefined complexity mapping table comprising anti-patterns and their respective complexity weightage; and
determining a cumulative score of the computed complexity weightage of each of the evaluated anti-patterns.

9. The method as claimed in claim 1, wherein evaluating the equivalent backing services associated with the target cloud platform comprises: extracting backing services consumed by the application in the source cloud platform from the runtime data; and
analyzing the target cloud platform data based on the extracted backing services using backing service recommendation rules.

10. The method as claimed in claim 1, wherein the migration readiness of the application to the target cloud platform is assessed based on the migration parameters including the tech-stack suitability score, the anti-patterns and the migration complexity score, wherein a value of each of the parameters including the tech-stack suitability score and the migration complexity score within a preset threshold, and the anti patterns in one or more predefined categories rehost, refactor and replatform is indicative that the application may be considered ready for migration.

11. The method as claimed in claim 1, wherein the migration readiness report comprises at least the cloud design patterns used in the source cloud platform, the runtime data of the application, equivalent backing services associated with the target cloud platform, tech-stacks consumed by the application in the source cloud platform and their suitability for migration, the tech-stack suitability score, a detailed summary of the anti-patterns and the cloud impediments, the migration complexity score, and migration recommendations including rehost, replatform, refactor, and rebuild.

12. The method as claimed in claim 1, wherein generating the deployment configurations as per the target cloud platform comprises: selecting a pre-configured deployment template as per the target cloud platform, wherein the pre-configured deployment template is customizable and selected from a group comprising deployment yaml templates, configMap yaml template, service yaml internal template and service yaml external templates;
evaluating a value of each of one or more placeholders associated with the selected pre-configured deployment template based on the runtime data of the application and equivalent backing services of the target cloud platform from the migration readiness report; and
incorporating the evaluated values in the one or more placeholders.

13. The method as claimed in claim 1, wherein migrating the application from the source cloud platform to the target cloud platform based on the generated deployment configurations comprises: transforming the source code of the application as per the target cloud platform by inserting new files and pieces of code into the source code of the application based on the migration readiness report; and
creating a Continuous Integration/Continuous Deployment (CI/CD) pipeline using the generated deployment configurations and the transformed application code.

14. A system for migrating an application from a source cloud platform to a target cloud platform, the system comprising: a memory storing program instructions; a processor configured to execute program instructions stored in the memory; and an assessment and migration engine executed by the processor, and configured to:
evaluate migration parameters based on a source code of the application, a runtime data associated with the application and a target cloud platform data, wherein the migration parameters include cloud impediments associated with the application, a tech-stack suitability score, anti-patterns associated with the application, a migration complexity score associated with the application, and equivalent backing services associated with the target cloud platform, and wherein evaluating the anti-patterns associated with the application comprises:
identifying one or more predetermined anti pattern expressions within the source code of the application;
evaluating the anti-patterns based on the identified one or more anti-pattern expressions using a predefined anti-pattern mapping table comprising the one or more anti-patterns mapped with respective anti-pattern expressions; and
categorizing the evaluated anti patterns into a plurality of categories comprising rehost, replatform, and rebuild based on complexity of the identified one or more anti-pattern expressions;
assess a migration readiness of the application to the target cloud platform based on one or more evaluated migration parameters;
generate a migration readiness report based on the evaluated migration parameters, the assessed migration readiness and the runtime data of the application;

generate deployment configurations as per the target cloud platform for migrating the application based on the migration readiness report, and wherein the deployment configurations as per the target cloud platform are generated if respective values of the tech-stack suitability score and the migration complexity score are within a preset threshold, and the anti-patterns are in one or more categories refactor and replatform; and migrate the application from the source cloud platform to the target cloud platform based on the generated deployment configurations.

15. The system as claimed in claim 14, wherein the assessment and migration engine comprises an interface unit executed by the processor, said interface unit configured to provide interfacing with a code hosting platform, the source cloud platform and the target cloud platform, said interface unit configured to retrieve the source code of the application from the code hosting platform, retrieve the runtime data from the source cloud platform, and retrieve the target cloud platform data from the target cloud platform, wherein the target cloud platform data comprises at least the backing services associated with the target cloud platform.

16. The system as claimed in claim 14, wherein the runtime data comprises CPU consumption of the application in the source cloud platform, memory consumed or requested by the application in the source cloud platform, build packs used for hosting the application in the source cloud platform, number of instances of the application running on the source cloud platform, and backing services consumed by the application at the runtime in the source cloud platform.

17. The system as claimed in claim 14, wherein the assessment and migration engine comprises an interface unit executed by the processor, said interface unit configured to retrieve the runtime data of the application from the source cloud platform by:
  receiving API endpoint details of the source cloud platform and at least one of: name of the application and access credentials of the source cloud platform; and
  accessing the source cloud platform based on the API endpoint details and at least one of: name of the application and access credentials of the source cloud platform via a cloud profiler tool.

18. The system as claimed in claim 14, wherein the assessment and migration engine comprises a data analysis unit executed by the processor, said data analysis unit configured to evaluate migration parameters based on the source code of the application, the runtime data associated with the application and the target cloud platform data using one or more analysis techniques.

19. The system as claimed in claim 14, wherein the migration parameters including the cloud impediments, the tech-stack suitability score, and the anti-patterns are evaluated by analyzing the source code of the application using static code analysis techniques based on a predefined set of regex rules, said predefined set of regex rules configured to identify one or more predefined patterns associated with respective migration parameters.

20. The system as claimed in claim 14, wherein evaluating the cloud impediments associated with the application comprises, identifying one or more predetermined impediment-patterns within the source code of application using impediment identification regex rules from a predefined set of regex rules; and evaluating the cloud impediments based on the identified one or more impediment-patterns using predefined impediment mapping table comprising cloud impediments mapped with respective impediment-patterns.

21. The system as claimed in claim 14, wherein the tech-stack suitability score is representative of a cumulative score of suitability of tech-stacks deployed on the source cloud platform in relation to the target cloud platform, wherein evaluating the tech-stack suitability score comprises:
  identifying one or more predetermined tech-stack patterns within the source code of the application using tech-stack suitability evaluation regex rules from a predefined set of regex rules;
  evaluating one or more tech-stacks consumed by the application in the source cloud platform based on the identified one or more tech-stack patterns using a predefined tech-stack mapping table comprising the one or more tech-stacks mapped with respective tech-stack patterns;
  determining a weightage associated with each of the evaluated tech-stacks depending on the suitability of respective evaluated tech-stacks with the selected target cloud platform; and
  computing a cumulative score of weightage of each of the evaluated tech-stacks.

22. The system as claimed in claim 14, wherein the category rehost comprises anti-patterns having least complexity in migration, the category replatform comprises anti-patterns having medium complexity in migration, the category refactor comprises anti-patterns having high complexity in migration, and rebuild comprises anti-patterns having a very high complexity in migration.

23. The system as claimed in claim 14, wherein the migration complexity score associated with the application is representative of complexity associated in migrating the application from the source cloud platform to the target cloud platform, said migration complexity score is evaluated based on the evaluated anti-patterns by:
  computing a complexity weightage associated with each of the evaluated anti-patterns based on a predefined complexity mapping table comprising anti-patterns and their respective complexity weightage; and
  determining a cumulative score of the computed complexity weightage of each of the evaluated anti-patterns.

24. The system as claimed in claim 14, wherein evaluating the equivalent backing services associated with the target cloud platform comprises: extracting backing services consumed by the application in the source cloud platform from the runtime data; and
  analyzing the target cloud platform data based on the extracted backing services using backing service recommendation rules.

25. The system as claimed in claim 14, wherein the migration readiness of the application to the target cloud platform is assessed based on the migration parameters including the tech-stack suitability score, the anti-patterns and the migration complexity score, wherein a value of each of the parameters including the tech-stack suitability score and the migration complexity score within a preset threshold, and the anti patterns in one or more predefined categories rehost, refactor and replatform is indicative that the application may be considered ready for migration.

26. The system as claimed in claim 14, wherein the assessment and migration engine comprises a report generation unit executed by the processor, said report generation unit configured to generate the migration readiness report, wherein the migration readiness report comprises at least the cloud design patterns used in the source cloud platform, the runtime data of the application, equivalent backing services associated with the target cloud platform, tech-stacks consumed by the application in the source cloud platform and their suitability for migration, the tech-stack suitability score, a detailed summary of the anti-patterns and the cloud impediments, the migration complexity score, and migration recommendations inducing rehost, replatform, refactor, and rebuild.

27. The system as claimed in claim 14, wherein generating the deployment configurations as per the target cloud platform comprises, selecting a pre-configured deployment template as per the target cloud platform; evaluating a value of each of one or more placeholders associated with the selected pre-configured deployment template based on the runtime data of the application and equivalent backing services of the target cloud platform from the migration readiness report; and incorporating the evaluated values in the one or more placeholders.

28. The system as claimed in claim 27, wherein the pre-configured deployment templates are customizable, and selected from a group comprising deployment yaml templates, configMap yaml template, service yaml internal template and service yaml external templates.

29. The system as claimed in claim 14, wherein migrating the application from the source cloud platform to the target cloud platform based on the generated deployment configurations comprises: transforming the source code of the application as per the target cloud platform by inserting new files and pieces of code into the source code of the application based on the migration readiness report; and creating a Continuous Integration/Continuous Deployment (CI/CD) pipeline using the generated deployment configurations and the transformed application code.

30. A computer program product comprising: a non-transitory computer-readable medium having computer-readable program code stored thereon, the computer-readable program code comprising instructions that, when executed by a processor, cause the processor to:
  evaluate migration parameters based on a source code of the application, a runtime data associated with the application and a target cloud platform data, wherein the migration parameters include cloud impediments associated with the application, a tech-stack suitability score, anti-patterns associated with the application, a migration complexity score associated with the application, and equivalent backing services associated with the target cloud platform, and wherein evaluating the anti-patterns associated with the application comprises:
  identifying one or more predetermined anti-pattern expressions within the source code of the application;
  evaluating the anti-patterns based on the identified one or more anti pattern expressions using a predefined anti pattern mapping table comprising the one or more anti patterns mapped with respective anti-pattern expressions; and
  categorizing the evaluated anti-patterns into a plurality of categories comprising rehost, replatform, and rebuild based on complexity of the identified one or more anti-pattern expressions;
  assess a migration readiness of the application to the target cloud platform based on one or more evaluated migration parameters;
  generate a migration readiness report based on the evaluated migration parameters, the assessed migration readiness and the runtime data of the application;
  generate deployment configurations as per the target cloud platform for migrating the application based on the migration readiness report, and wherein the deployment configurations as per the target cloud platform are generated if respective values of the tech-stack suitability score and the migration complexity score are within a preset threshold, and the anti-patterns are in one or more categories refactor and replatform; and
  migrate the application from the source cloud platform to the target cloud platform based on the generated deployment configurations.

* * * * *